(12) United States Patent
Mayer

(10) Patent No.: US 6,473,090 B1
(45) Date of Patent: Oct. 29, 2002

(54) MIP MAPPING BASED ON MATERIAL PROPERTIES

(75) Inventor: Neal L. Mayer, Salt Lake City, UT (US)

(73) Assignee: Evans & Sutherland Computer Corporation, Salt Lake City, UT (US)

(*) Notice: Subject to any disclaimer, the term of this patent is extended or adjusted under 35 U.S.C. 154(b) by 0 days.

(21) Appl. No.: 09/433,398

(22) Filed: Nov. 3, 1999

(51) Int. Cl.$^7$ ................................................ G06T 11/40

(52) U.S. Cl. ........................................ 345/587; 345/582

(58) Field of Search ................................. 345/582, 587, 345/419, 420, 421, 422, 418, 426, 609, 522

(56) References Cited

U.S. PATENT DOCUMENTS 5,977,977 A * 11/1999 Kajiya et al. ............... 345/418
6,184,888 B1 * 2/2001 Yuasa et al. ................ 345/419

OTHER PUBLICATIONS

Jean–Pierre Gamboto, "Combining Image Analysis and Thermal Models for Infared Scene Simulations", 1994, Image Processing Proceedings, ICIP–94, IEEE International Conference, vol. 1.*

* cited by examiner

*Primary Examiner*—Matthew Luu
(74) *Attorney, Agent, or Firm*—Thorpe North & Western, LLP

(57) ABSTRACT

A method for MIP mapping index texture. This invention has index texture with texel index values which refer to physical material properties. First, a lookup table is stored and the lookup table has table entries defining material types. Each table entry has an index, and material property type values. Then at least two texels are selected from the index texture, where each texel has index values corresponding to table entries. Next, the material property type values are averaged for each separate property type from the table entries for the selected texels. This produces an average material property value for each material property type. Another step is selecting a new material index based on the material which most closely matches the average material property values. The final step is generating the next lowest MIP level by using the new material indexes to form a new index texture with fewer texels.

23 Claims, 6 Drawing Sheets

$K = 1.31307 \times 10^{-7} + 4.0484 \times 10^{-7} k$

MIP MAPPING BASED ON MATERIAL PROPERTIES

TECHNICAL FIELD

This invention relates generally to the field of computer graphics simulation and more particularly to MIP mapping an index texture in a computer graphics simulation system.

BACKGROUND ART

Many computer graphics systems have a type of texture called index texture. An index texture map contains an index or pointer in each texel instead of the more typical red-green-blue (RGB) or intensity texel value. The index stored in the texel points to an entry in a look-up table of color values or gray scale values stored in the image generator's memory. The value from the table is then used in rendering the texture. FIG. 1 shows a graphic representation of the use of an index texture. A texture map 20 is shown and that texture map is then mapped onto a polygon 22. Since the texture map 20 on the polygon 22 initially contains only indexes, these indexes 23 must be correlated to the intensity lookup table 24 or color lookup table. This provides intensity and texture to the final polygon 26.

The advantage of using index texture is that the look-up table can be dynamically updated by the image generator, which results in constantly changing texture without rebuilding the texture maps for the polygons. The disadvantage of index texture is that the look-up table is usually quite limited in its length which limits the possible color or intensity values that can be used in the texture.

Index textures are very useful for the computer simulation of various sensors used on aircraft, tanks and other weapon systems. The typical application is for infrared sensors or perhaps night-vision goggles. For example, in the infrared application of index texture, the index stored in each texel of a map represents a material. An index of 4 may indicate a wood color stored in the color table. So, a texel that had a 4 as its index would represent wood. During real-time simulation, the image generation software computes the appropriate gray value for wood given the current simulated environmental conditions. This gray value will be loaded into the look-up table. When the wood texel is processed, the index value of 4 is substituted with the gray value so that as the texel is rendered, it looks as it should for wood.

A standard list of materials used by computer graphics modelers has been developed for various infrared (IR) simulations. The preferred embodiment of this list contains thirty-nine typical materials and a very long list of not-so-common materials. These uncommon materials are often referred to as exotic materials. The modelers do not use these exotic materials unless a special application, which has been well planned for, requires them. Each material typically has six attributes that define the physical properties necessary for computing its gray value which simulates infrared for the current environmental conditions. Of course, it should be realized that the number of properties defined in the table is only limited by the number of properties desired to be modeled. Table 1 shows thirty-nine common materials with their associated physical properties and values.

TABLE 1

Common Materials

| # | Description | $\epsilon$ | $\alpha$ | k | d | c | $\rho$ |
|---|---|---|---|---|---|---|---|
| 1 | steel-bare | 0.66 | 0.55 | 46. | 0.02 | 444. | 7830. |
| 2 | steel-paint | 0.80 | 0.40 | 46. | 0.02 | 444.7 | 7830. |
| 3 | stone-brick | 0.75 | 0.60 | 1.4 | 0.15 | 00. | 2500. |
| 4 | wood | 0.89 | 0.78 | 0.16 | 0.04 | 100. | 600. |
| 5 | glass | 0.90 | 0.28 | 0.71 | 0.003 | 715. | 2600. |
| 6 | vinyl-siding | 0.72 | 0.1 | 0.16 | 0.003 | 300. | 1200. |
| 7 | clay-tile | 0.91 | 0.65 | 1.4 | 0.01 | 600. | 2200. |
| 8 | shingle-wood | 0.82 | 0.72 | 0.16 | 0.01 | 100. | 500. |
| 9 | shingle-asphalt | 0.91 | 0.86 | 0.74 | 0.003 | 150. | 2000. |
| 10 | plastic | 0.72 | 0.07 | 0.16 | 0.01 | 300. | 1200. |
| 11 | fabric | 0.78 | 0.67 | 0.036 | 0.001 | 1380. | 58. |
| 12 | rubber | 0.93 | 0.91 | 0.15 | 0.02 | 1420. | 2000. |
| 13 | water | 0.98 | 0.67 | 0.56 | 0.06 | 4184. | 1000. |
| 14 | desert-sand | 0.76 | 0.76 | 0.31 | 0.07 | 710. | 2160. |
| 15 | lava | 0.90 | 0.96 | 1.0 | 0.13 | 810. | 2100. |
| 16 | basalt | 0.72 | 0.72 | 2.0 | 0.18 | 710. | 2300. |
| 17 | gravel | 0.49 | 0.75 | 2.0 | 0.16 | 810. | 2600. |
| 18 | rocks | 0.60 | 0.55 | 2.1 | 0.17 | 850. | 2300. |
| 19 | boulders | 0.75 | 0.45 | 1.8 | 0.16 | 850. | 2300. |
| 20 | concrete-bare | 0.94 | 0.67 | 1.4 | 0.14 | 880. | 2300. |
| 21 | concrete-paint | 0.85 | 0.50 | 0.92 | 0.11 | 850. | 2300. |
| 22 | soil-wet | 0.75 | 0.85 | 0.52 | 0.05 | 2500. | 2050. |
| 23 | soil-dry | 0.65 | 0.75 | 0.335 | 0.05 | 1840. | 2050. |
| 24 | salt-pan | 0.93 | 0.38 | 7.1 | 0.25 | 1500. | 2000. |
| 25 | crops | 0.89 | 0.76 | 0.1 | 0.01 | 2300. | 400. |
| 26 | ground-cover-desert | 0.80 | 0.60 | 0.15 | 0.01 | 2000. | 400. |
| 27 | ground-cover-general | 0.80 | 0.50 | 0.15 | 0.01 | 1600. | 350. |
| 28 | grass-short | 0.65 | 0.71 | 0.1 | 0.01 | 1600. | 350. |
| 29 | wetland-veg | 0.86 | 0.69 | 0.57 | 0.01 | 2500. | 500. |
| 30 | tree-trunks | 0.89 | 0.95 | 0.13 | 0.05 | 2500. | 600. |
| 31 | leaves | 0.92 | 0.72 | 0.1 | 0.001 | 3500. | 500. |
| 32 | bushes | 0.90 | 0.75 | 0.001 | 0.001 | 2500. | 600. |
| 33 | snow | 0.82 | 0.25 | 0.18 | 0.10 | 1800. | 300. |
| 34 | ice | 0.64 | 0.25 | 2.2 | 0.19 | 1920. | 913. |
| 35 | asphalt-bare | 0.93 | 0.83 | 0.74 | 0.14 | 920; | 1200. |
| 36 | asphalt-paint | 0.85 | 0.86 | 0.74 | 0.14 | 920. | 1200. |
| 37 | asphalt-paint-white | 0.80 | 0.36 | 0.74 | 0.14 | 920. | 1200. |
| 38 | alum-paint-light | 0.85 | 0.45 | 205. | 0.02 | 900. | 2700. |
| 39 | alum-paint-dark | 0.90 | 0.86 | 205. | 0.02 | 900. | 2700. |

To aid in the understanding of Table 1 each property will be defined briefly below.

1. Emissivity, $\epsilon$, (e.g. infrared), is the long wavelength thermal emissivity for a material. In other words, emissivity is the proportion of the total energy emitted from the material that is in the long wavelength band.

2. Absorption, $\alpha$, (no units), is the absorptance for solar radiation for the material. This represents the proportion of the solar radiation hitting the material that is absorbed.

3. Conductivity, k, (W m$^{-\circ}$ C.), is the thermal conductivity of the material.

4. The diurnal depth, d, (meters), of a material is the thickness of the material that participates in the daily heat exchange. If the typical thickness of a material is greater than the diurnal depth, then we really only need to use the diurnal depth for the thickness of the material. If the typical thickness of the material is less than the diurnal depth, then we should use the thickness. The material table contains the smaller of the diurnal depth or typical thickness, which will be used for calculations.

5. Specific heat, c (J kg$^{-1}$K$^{-1}$).

6. Density, $\rho$, (kg m$^{-3}$).

It appears to be a straight forward problem to create a texture map where each texel represents a material. However, it actually turns out to be quite difficult to do in practical applications. Most of the texture maps in simulation systems are derived from full-color photographs. The problem then becomes one of inferring from each pixel in the photograph what material is shown and then assigning the appropriate index.

After the initial assigning of material types to each texel, the problem is how to MIP the texture map. Mipping involves creating lower-resolution maps representing the same information. A MIP map is a prefiltered image of the original texture which is created to avoid aliasing in the simulated image. FIG. 2 shows the basic idea of mipping. The goal of mipping a texture map is that fewer texels have to be processed in real-time and the MIP maps are generated and stored in advance for use at run-time. The ideal texture map size is to have about one texel for every pixel. If the perspective size of a texture map gets too small and there are to many texels per pixel, aliasing is produced in the final picture. That is where the lower MIP map levels come in. There are fewer pixels in the lower MIP levels and thus there are fewer texels per pixel. To make the image look good, the lower MIP levels should look just the same as the higher MIP levels when displayed over the same number of pixels.

In typical texture map mipping, the values of adjacent texels are averaged together to determine the value of the texel at the lower MIP level. This works well for an RGB or intensity map, but it does not make sense to use this method for index texture maps. What does it mean to average the indexes of 1, 6, 4, and 27? The average of the material index entries in the lookup table do not necessarily yield the color found at the index of 9.5! Further, it cannot be assumed that the color or gray scale changes across the lookup table will be linear. This is especially true where infrared is being simulated. Since the index in each texel represents a material, what does it mean to average steel-bare, vinyl siding, wood, and ground-cover? An index of 9 would be shingle-asphalt and 10 would be plastic. Thus, there is no logical or physical world correlation. Averaging the indexes of an index texture does not provide an accurate value for a material used in the MIP map. This problem is increased when the index textures are used in an infrared simulation system to simulate infrared instruments. This is because the infrared simulation should show a simulated picture of the infrared radiation emitted from an object. Therefore, averaging together the color value does not simulate the actual properties of the objects which generate the infrared radiation.

Accordingly, it would be an advancement over the state of the art in computer graphics simulation to provide a device and method for effectively MIP mapping an index texture map for use with sensor simulation (e. g. , infrared, or night-vision goggles).

OBJECTS AND SUMMARY OF THE INVENTION

It is an object of the present invention to provide a method for MIP mapping index textures.

It is another object of the present invention to provide a method for MIP mapping index textures using a look-up table containing material properties.

It is another object of the present invention to provide a method for MIP mapping index textures using a look-up table containing material properties and several material characteristics combined into a function.

It is yet another object of the present invention to provide a method for MIP mapping index texture used in an infrared simulation system.

The presently preferred embodiment of the invention is a method for MIP mapping index texture. The index texture has texel index values which refer to physical material properties. The first step of the method is storing a lookup table, having table entries defining material types, wherein each table entry has an index, and material property type values. Then at least two texels are selected from the index texture, where each texel has index values corresponding to table entries. Next the material property type values are averaged for each separate property type from the table entries for selected texels. This produces an average material property value for each material property type. Another step is selecting a new material index based on the material which most closely matches the average material property values. The final step is generating the next lowest MIP level by using the new material indexes to form a new index texture with fewer texels.

These and other objects, features, advantages and alternative aspects of the present invention will become apparent to those skilled in the art from a consideration of the following detailed description taken in combination with the accompanying drawings.

DISCLOSURE OF THE INVENTION

Reference will now be made to the drawings in which the various elements of the present invention will be given numerical designations and in which the invention will be discussed so as to enable one skilled in the art to make and use the invention. It is to be understood that the following description is only exemplary of certain embodiments of the present invention, and should not be viewed as narrowing the claims which follow.

In this invention, instead of averaging the indexes of the texels to form the texel indexes for the lower MIP level, the physical attributes of the materials are averaged and then the closest material that matches those averaged attributes is chosen as the material/index for the lower MIP-level texel. For example, instead of averaging an index of 1, 6, 4, and 27, the algorithm will average the emissivity, absorptance, conductivity, diurnal depth, etc., of steel-bare, vinyl siding, wood, and ground-cover (the materials represented by those indexes) to yield a new material mixture. Then the closest fit of all possible materials is chosen and its index is inserted in the lower level MIP map texel.

Figure 1:
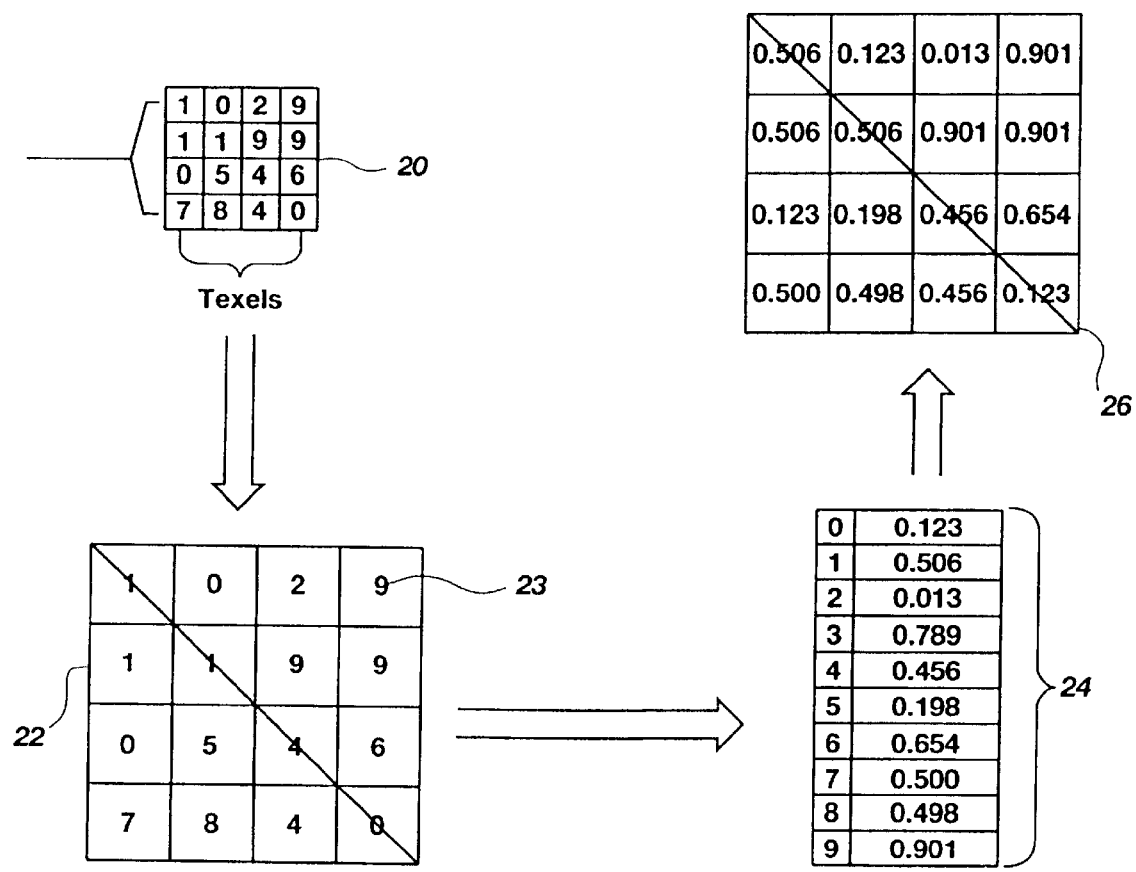
FIG. 1 shows conventional index texturing.
Figure 2:
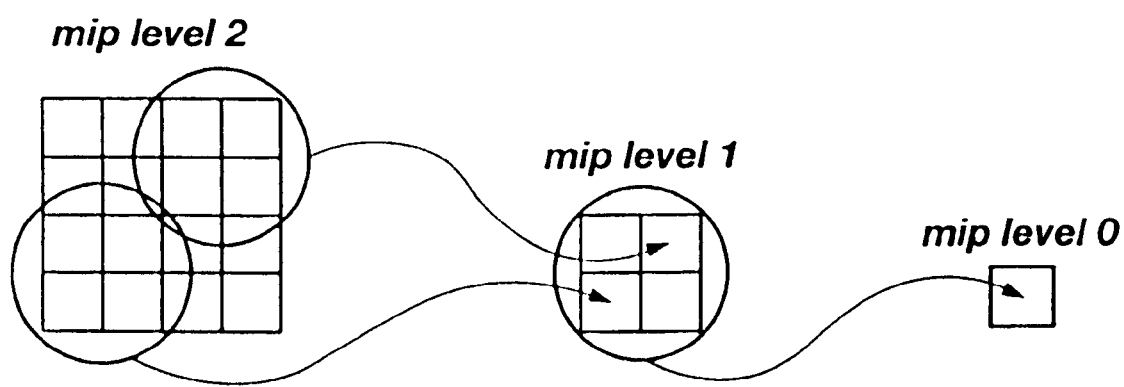
FIG. 2 shows a simple summary of creating a MIP map.
Figure 3:
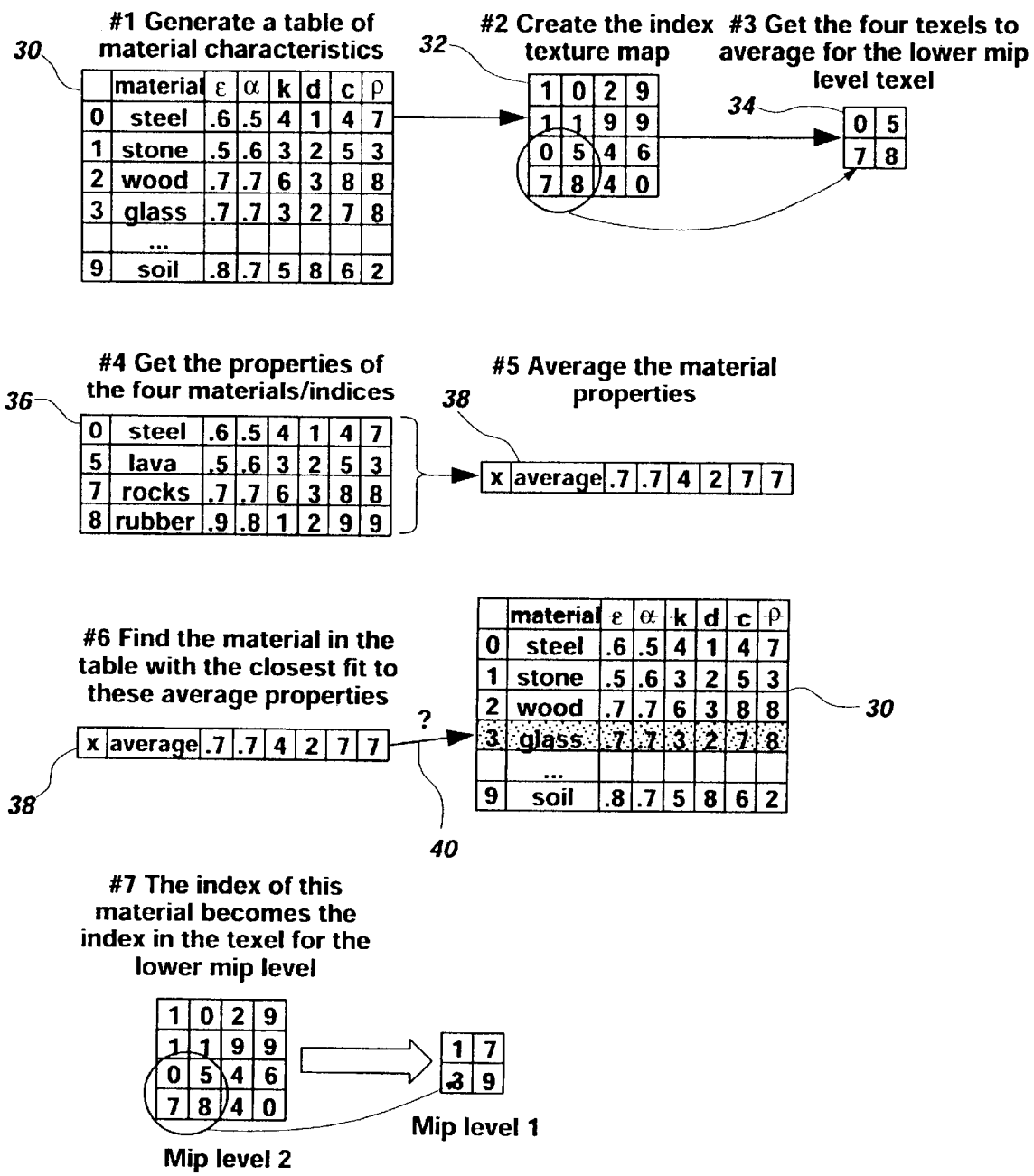
FIG. 3 shows the steps required to MIP map index texture.

FIG. 3 shows the detailed steps required for finding a new material for the averaged material properties. A table of material characteristics 30 or a material lookup table must have been generated. This will generally be predetermined and setup before run-time. A texture map 32 is then created where each texel contains indexes into the material lookup table 30. Next, an area 34 is selected for MIP mapping to a lower level. The properties of the four materials are retrieved 36 and the material properties are averaged to create a single averaged entry 38. The material properties in the averaged entry 38 are then compared to the material properties in the entries of the table of material characteristics 30 to determine which material is the closest match for the averaged entry. An index is selected 40 which best matches the material property averages and that index becomes the texel index for the mipped texture map at the lower level. As described before, material properties then allow a certain color or gray scale to be generated which is provided for the viewer of the simulated image. It should be recognized that a gray scale or monochrome scale is preferred because it simulates infrared view finders, but other color combinations could also be used to represent long wavelength energy emissions. In addition, more than four texels can be averaged together and other filter shapes could be used which are not necessarily square.

In the case of a simulated IR image, the texture should look the same for the lower MIP levels as it does for the higher MIP levels over the same number of pixels. One texel from a lower MIP level over one pixel should look the same as four texels from a higher MIP level on one pixel. Computationally, this means that the computed IR gray for one texel from a lower MIP level should look the same as the average of the four texels from the higher MIP level.

To test this invention, suppose that four materials are randomly chosen and averaged together. Then their IR gray is computed for a randomly chosen set of environmental conditions. Next the average IR gray for those four texels is computed and the properties of the four materials are averaged to create a new mixture material for which the IR gray is computed. It is then valuable to compare the two values: the average IR gray of the four texels with the IR gray of the texel representing the mixture of materials.

When thousands of random combinations of materials and environmental conditions are tested, the difference in IR gray is never more than 29 percent with an average difference of 2 percent. This is a close approximation for the vast majority of the samples. In one implementation of the invention, the IR gray values go from 0 to 1 with either 16 or 12 bits of resolution. These values depend on the hardware format and available memory space. An average material (formed by averaging the properties) is generally very close to the same IR gray value as taking the four computed IR grays and averaging them.

In the preferred embodiment of the invention, a limited length look-up table is used by the index texture because of hardware implementation restrictions. However, it should be realized that any number of entries could be in the lookup table. So in the preferred implementation, each texel in an index texture map will have an index value of 0 to 255 because the length of the look-up table is only 256 entries long. Since each entry in the look-up table represents a material, there can only be 256 materials. A few of the entries will be reserved for entries for special cases. For example, if 32 entries were reserved for special materials that leaves only 224 table entries. From these entries, the mipping algorithm picks the material with properties closest to the average of the material properties. The common materials will come from these 224 by picking the closest entry in the table to match their actual characteristics.

In an alternative implementation of this invention, there are restrictions placed in the number of values for each of the properties. This is due to cost and hardware implementation constraints and these limitations are not always necessary. It is important to note that there are certain threshold values for the materials which have the greatest effect on the colors and IR gray generated in this invention. These threshold points affect the final color or gray values in relation to the material's physical properties.

To decide how many different values should be used for each of the different material properties, distribution analysis can help yield these threshold points for the values. The computed IR gray is sensitive to variations in all of the material properties.

Performing a value distribution analysis for the properties, aids in deciding how many different values for the material properties should be represented by the mixture materials in the image generator look-up table. Each of the graphs shown in FIGS. 4–7 represent 5000 samples of a given material property. A sample consists of randomly selecting four common materials and then averaging the value of the specific physical characteristic being analyzed. Thus, the graphs show the values for each of the material properties that needs to be in the look-up table to accurately simulate the mixing of materials for the mipping algorithm.

Figure 4:
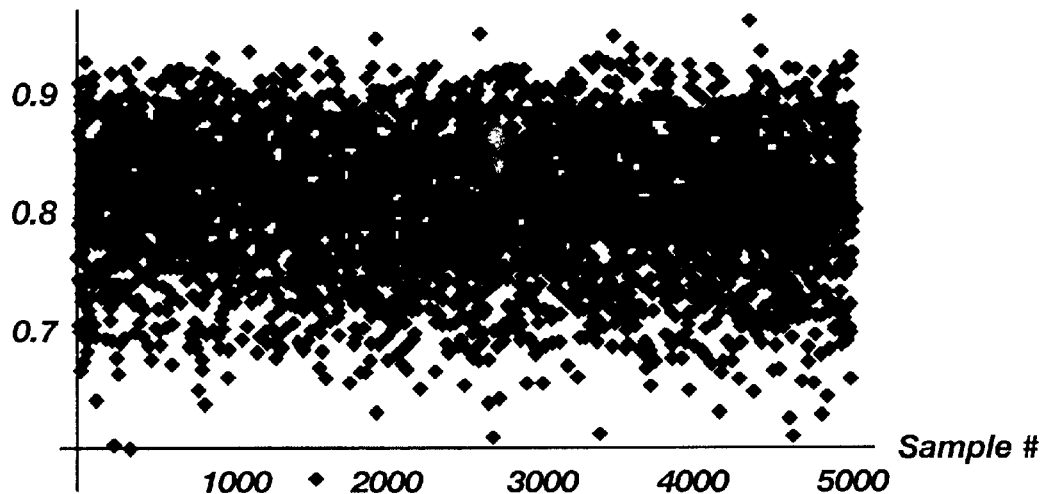
FIG. 4 shows the emissivity in frequently simulated materials.
Figure 5:
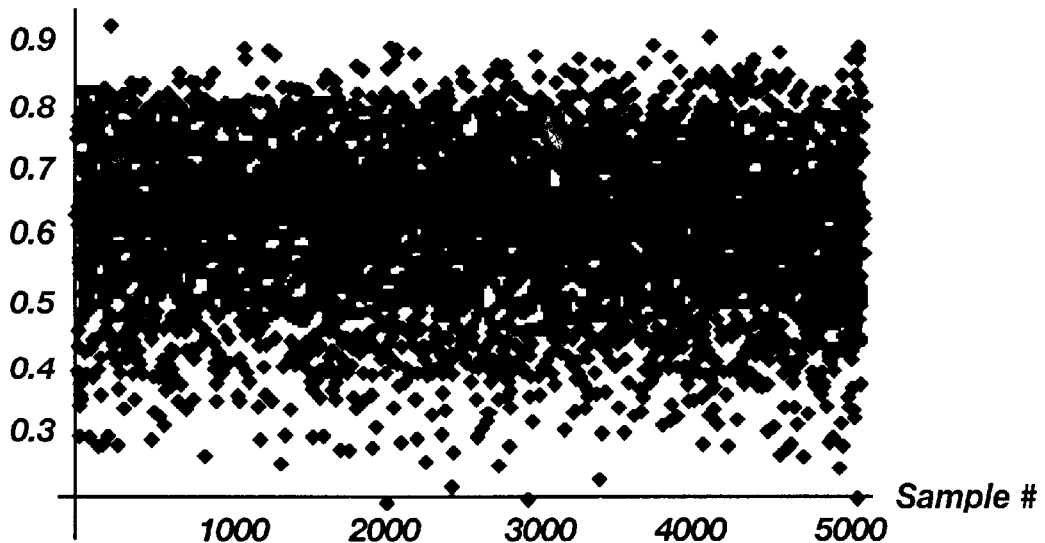
FIG. 5 shows the absorptance in frequently simulated materials.

As can be seen in FIG. 4, the mixed emissivity is fairly well distributed between 0.7 and 0.9 with some values down to 0.5. The look-up table should represent this range with as much resolution as possible. FIG. 5 shows that the mixed absorptances are fairly well distributed between 0.4 and 0.8 with some values down to 0.1. The look-up table should also represent this range with as much resolution as possible.

Figure 6:
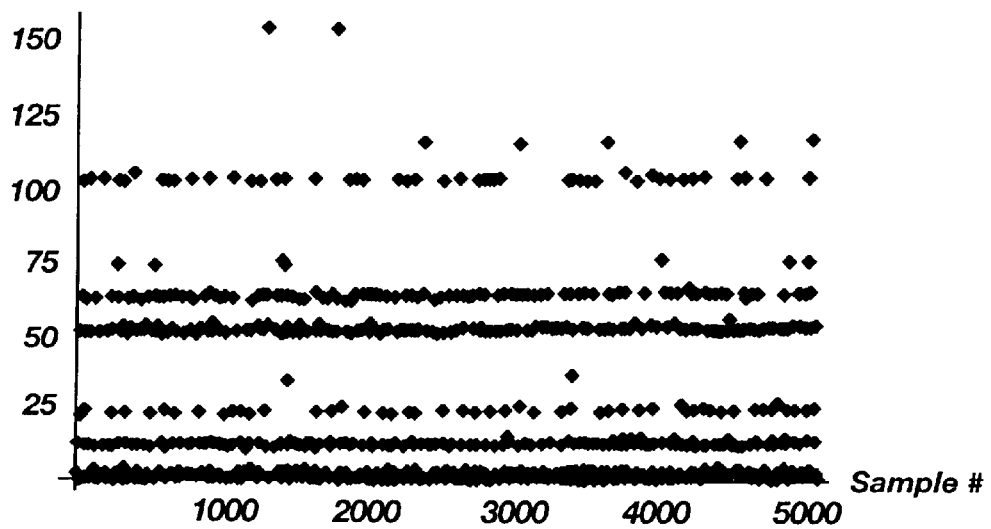
FIG. 6 shows the conductivity bands for frequently simulated materials.
Figure 7:
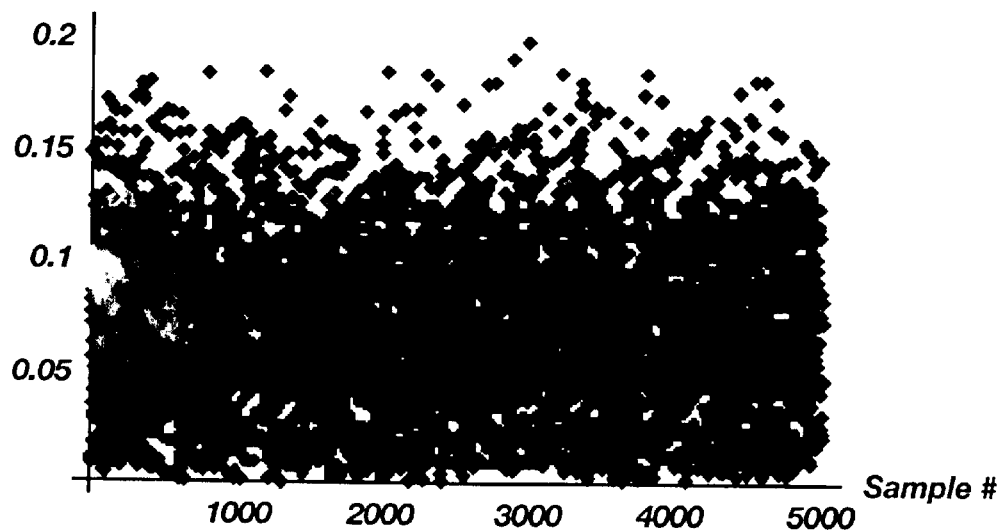
FIG. 7 shows the diurnal depth for frequently simulated materials.

Interestingly, the conductivity of mixed materials behaves much differently as seen in FIG. 6. There are three very heavily used values: 0.75, 12, and 55. There are also three moderately heavy bands at 24, 63, 103. FIG. 7 shows that the diurnal depth is certainly concentrated more in the range of 0.01 to 0.18, but continues with a few samples up into the 0.20 range.

Reducing the number of material parameters which must be stored is another advantageous embodiment of the invention. The advantage of reducing the number of material parameters which must be stored reduces the hardware storage requirements for the table. If the table contains all six values for material properties, it makes the table far too large to store all the possible combinations efficiently. In order to reduce the number of properties which are stored, a smaller set of material properties can be created. One configuration to reduce the number of properties is to form a new property named $\kappa$, defined as $\kappa=K/c\rho$, where K is the conductivity, c is the specific heat, and $\rho$ is the density. This is called the coefficient of conductivity. This is advantageous because c and $\rho$ do not need to be stored. $\kappa$ can be stored as a property because the computation of IR gray never uses c or $\rho$ independently, it only uses $\kappa$. It should be apparent based on this disclosure that other combinations of properties could also be created if desired.

Figure 8:
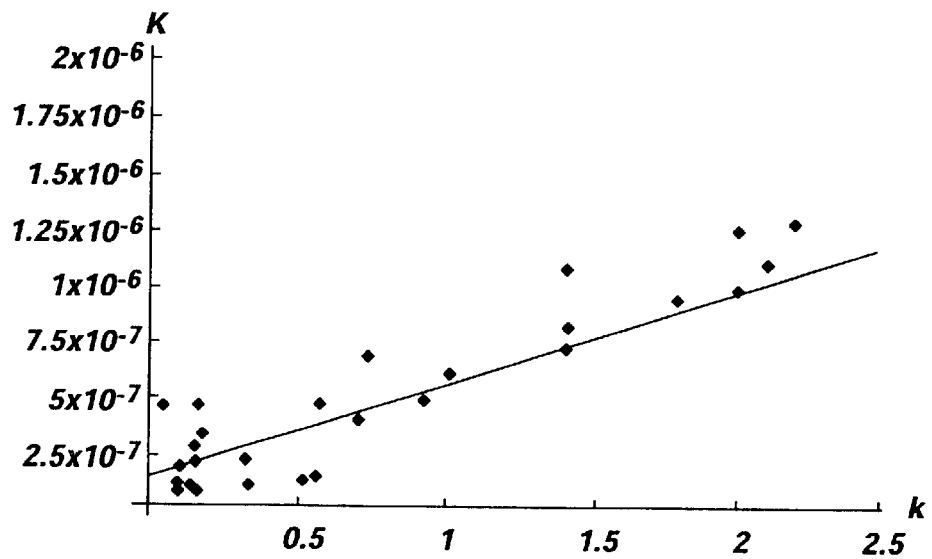
FIG. 8 shows an interpolated function fitted to combine several material properties.

Even having five parameters can be an inefficient use of hardware storage space. To avoid having to store values $\kappa$, a function can be generated which correlates k to $\kappa$. In fact, a more accurate value for $\kappa$ can be produced from a function than if the table is used to only represent a few possible values for $\kappa$ in the finite length of the materials list. FIG. 8 shows the function of k vs. $\kappa$. The scattered dots are values of $\kappa$ from the material properties and the line is the function to be used to represent $\kappa$.

The advantage of computing $\kappa$ as a function of k instead of reading it as a property of the material is the hardware savings. In contrast, the disadvantage of not having quite the right κ is that materials change temperatures at a different rate. Despite this, it has been determined that the rates were still of the same magnitude with either the correctly computed κ or the function. For example, a few seconds with the correct κ was still a few seconds with the function fit κ, likewise minutes were still minutes and hours were still hours. It is unlikely that users will notice the slight difference in how fast the materials change temperature.

The organization of the image generator look-up table in the preferred embodiment will now be discussed. The texture look-u table on the image generator can have 256 entries. Since it is helpful to reserve some entries for special uses, all of the entries are not used. So, the table actually contains less than 256 materials. The question is what materials or material mixtures should it represent? To get a reasonably accurate IR simulation and a good mipping, the entries in the table should represent the appropriate physical material characteristics for at least the thirty-nine most common materials and their mixtures that will be formed during the mipping process.

The preferred organization of the table under the above criteria is to have two possible values for conductivity, four possible values for absorptance and diurnal depth, and seven possible values for emissivity. These values were determined by the analysis as described above. Then the table should contain the possible combinations of those values. This yields 224 material definitions (2×4×4×7=224).

Only two values are used for conductivity because the IR gray is sensitive to variations in the conductivity and the maximum IR gray was reached when the conductivity got above 2.0 or so. In fact, higher conductivities do not yield any brighter IR grays. The effect on IR gray was much more pronounced to lower conductivities than higher. So, just using the 0.5 and 2.0 values for conductivity should yield good results.

For the other characteristics, values are chosen to be evenly distributed through the range where most of the values in the scatter plots showed up. Based on looking at the graphs shown in FIG. 4–7, the preferred values for the physical material characteristics are:

emissivity $\epsilon\{0.53, 0.60, 0.66, 0.72, 0.79, 0.85, 0.92\}$ absorption $\epsilon\{0.21, 0.42, 0.63, 0.84\}$ conductivity $\epsilon\{0.5, 2.0\}$ diurnal depth $\epsilon\{0.03, 0.07, 0.12, 0.16\}$ Using these possible values for the physical properties of the materials yields the material definitions shown in Table 2. Only the first few and the last few entries are shown by way of example.

TABLE 2

Preferred Material Definitions

| # | ε | α | k | d |
|---|---|---|---|---|
| 1 | 0.7375 | 0.45 | 0.75 | 0.03 |
| 2 | 0.7375 | 0.45 | 0.75 | 0.06 |
| 3 | 0.7375 | 0.45 | 0.75 | 0.10 |
| 4 | 0.7375 | 0.45 | 0.75 | 0.13 |
| 5 | 0.7375 | 0.45 | 12. | 0.03 |
| 6 | 0.7375 | 0.45 | 12. | 0.06 |
| 7 | 0.7375 | 0.45 | 12. | 0.10 |
| 8 | 0.7375 | 0.45 | 12. | 0.13 |
| 9 | 0.7375 | 0.55 | 0.75 | 0.03 |
| ... | ... | ... | ... | ... |
| 219 | 0.8875 | 0.75 | 0.75 | 0.10 |

TABLE 2-continued

Preferred Material Definitions

| # | ε | α | k | d |
|---|---|---|---|---|
| 220 | 0.8875 | 0.75 | 0.75 | 0.13 |
| 221 | 0.8875 | 0.75 | 12. | 0.03 |
| 222 | 0.8875 | 0.75 | 12. | 0.06 |
| 223 | 0.8875 | 0.75 | 12. | 0.10 |
| 224 | 0.8875 | 0.75 | 12. | 0.13 |

The usefulness of this mipping algorithm using a look-u table for materials, can be tested by randomly choosing four materials from the table to average together. The IR gray is computed for a randomly chosen set of environmental conditions. Then the average IR gray is computed for those four texels. Next, the properties of the four materials are averaged and the closest fit is selected from the mixed material table. It is important to realize that closest in this context means pick the emissivity from the list of possible emissivities that is the closest to the average emissivity. This operation is also performed for the absorptance, conductivity, and diurnal depth. Then the material is chosen from the table that has these four values for the properties. The IR gray is also computed for the closest fit material.

Thousands of random combinations of materials and environmental conditions have been tested. The difference in IR gray was never more than 24 percent with an average error 3 percent. What this means is that as a texture map is mipping, there will be on the average only 3 percent difference in the IR gray rendered between the higher MIP level and the lower MIP level. The tri-linear blending of texture also helps makes this smooth and unnoticeable. It is interesting to note that the average error is almost the same as obtained with the general theory tests, but the maximum value is lower. The results from using a table with 224 entries are as good as if the table were infinitely long and we could find any average material we wanted amongst all possible property values. This is a surprising and useful result.

When the system modelers develope textures they assign a physical material to a texel and the physical material is mapped to one of the 224 entries in the standard look-u table. Normally, there are a number of predefined common materials which each have a slot in the table. in the preferred embodiment of this invention, there is no requirement to reserve 39 special slots for them as has been done in the past and give them special values. They can just be selections from the 224 materials which are defined using the reduced value set. Table 3 shows one possible mapping between the common materials and the standard index created by this invention.

TABLE 3

Mapping of Common Materials to Standard Material Indexes

| Common Material # | Description | Standard Index |
|---|---|---|
| 1 | steel-bare | 85 |
| 2 | steel-paint | 141 |
| 3 | stone-brick | 120 |
| 4 | wood | 217 |
| 5 | glass | 193 |
| 6 | vinyl-siding | 97 |
| 7 | clay-tile | 213 |
| 8 | shingle-wood | 145 |
| 9 | shingle-asphalt | 217 |

TABLE 3-continued

Mapping of Common Materials to Standard Material Indexes

| Common Material # | Description | Standard Index |
|---|---|---|
| 10 | plastic | 97 |
| 11 | fabric | 145 |
| 12 | rubber | 217 |
| 13 | water | 210 |
| 14 | desert-sand | 154 |
| 15 | lava | 219 |
| 16 | basalt | 120 |
| 17 | gravel | 32 |
| 18 | rocks | 56 |
| 19 | boulders | 112 |
| 20 | concrete-bare | 216 |
| 21 | concrete-paint | 171 |
| 22 | soil-wet | 121 |
| 23 | soil-dry | 89 |
| 24 | salt-pan | 208 |
| 25 | crops | 217 |
| 26 | ground-cover-desert | 145 |
| 27 | ground-cover-general | 137 |
| 28 | grass-short | 81 |
| 29 | wetland-veg | 177 |
| 30 | tree-trunks | 217 |
| 31 | leaves | 209 |
| 32 | bushes | 217 |
| 33 | snow | 131 |
| 34 | ice | 72 |
| 35 | asphalt-bare | 220 |
| 36 | asphalt-paint | 188 |
| 37 | asphalt-paint-white | 140 |
| 38 | asphalt-paint-light | 173 |
| 39 | asphalt-paint-dark | 221 |

It is also important that the IR gray computed for a material out of the modified physical materials list be an accurate representation of the common material properties. It is also possible to test to see how close the gray values are after quantizing the characteristics in the finite length table. Thousands of materials and environmental conditions were randomly selected and the difference in IR gray was never more than 24 percent and on the average only 3 percent. This produces an acceptable solution. As long as the relative differences from material to material are preserved, small differences in the gray values are less significant.

Table 2 shows the properties for each of the materials represented in the texture look-up table of the present invention. However, there is one very significant property missing from each material, and that is a support temperature. There is no distinction made for each material as to whether it is supported by a warm environment or a cold one. For example, steel-bare could be lying on the ground and have ground temperature for its support temperature (boundary temperature) or it may be on a vehicle near the engine and be quite hot. The temperature property is very significant for infrared simulation.

One possible solution to this shortcoming is to break the table up into sections for several different support temperatures. For example, there could be a separate section for cold, room temperature, warm, and hot. This would greatly reduce the number of other properties that could be represented and greatly reduce the accuracy of the table.

A much better solution is available by using the modulation bits associated with each texel. In the preferred embodiment of a texture map, each texel has not only an eight-bit index into the look-u table, it also has four bits for modulation. For example, if the value in these modulation bits represents 1.5 and if the gray value obtained from the table is 0.24, then the actual gray value of the texel would be 1.5×0.24=0.36.

When calculating the gray values to load into the look-up table, the real-time system needs to know the air temperature, the sun altitude, and the boundary temperature for each material. If the real-time system assumes a nominal boundary temperature when doing its computations, then the modulation bits can be used to scale the gray obtained from the table to yield the final desired gray.

This invention uses a function that scales the nominal gray value obtained from the table which assumes a 300 K boundary temperature to correct the gray for various other boundary temperatures. When the modeler assigns a material to a texel, he will also select a boundary temperature. The modeling tools will then put the appropriate index and modulation value in the texel. The modulation value uses four bits to represent a value from 0 to 15. The image generator divides this integer by 4 before multiplying by the value from the look-u table.

Table 4 shows the essential values for this technique.

TABLE 4

Modulation Bits for Boundary Temperatures

| Boundary/Support Temperature | K | ° C. | ° F. | Modulation Value | Modulation Field Bits |
|---|---|---|---|---|---|
| Cold | 266 | −7 | 19 | 0.50 | 0010 (2) |
| Mild | 284 | 11 | 52 | 0.75 | 0011 (3) |
| Room | 295 | 22 | 71 | 1.00 | 0100 (4) |
| Warm | 312 | 39 | 102 | 1.25 | 0101 (5) |
| Hot | 400 | 127 | 260 | 2.50 | 1010 (10) |

It should be realized that the real-time system will compute the IR gray values in the look-up table assuming a 300 K boundary condition temperature for these modulation values to work correctly.

Figure 9:
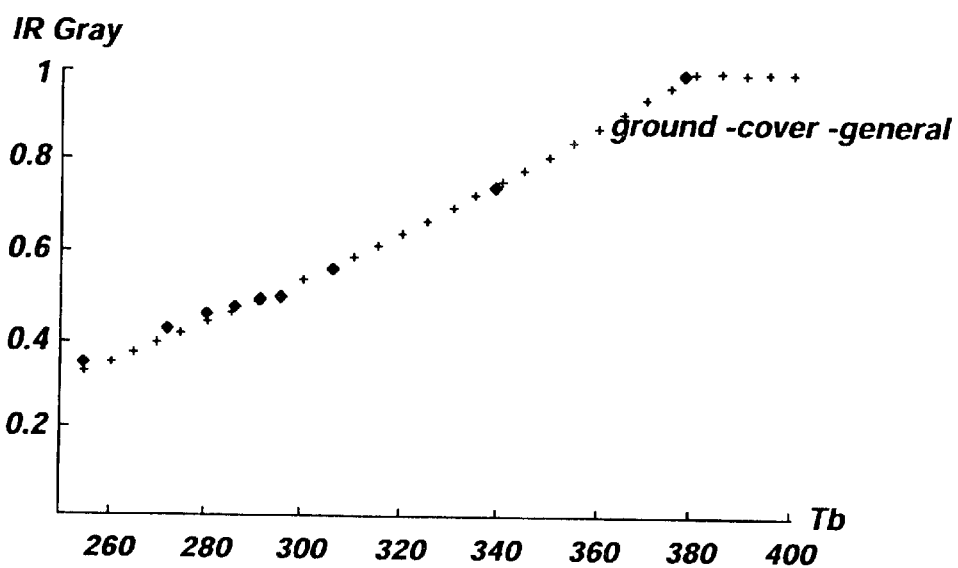
FIG. 9 shows a graph which plots the IR gray for a material over a broad range of boundary temperatures .

FIG. 9 shows a graph which plots the IR gray for material over a broad range of boundary temperatures (small dots) when computed using the actual boundary temperature versus the IR gray computed using 300 K as the boundary temperature and then scaled by the appropriate modulation value from Table 4 (large dots in FIG. 9). The accuracy of the estimate is not perfect, but it close enough for simulation applications. When generating the lower MIP levels of the texture map, the modulation values can simply be averaged.

What is claimed is:

1. A method for MIP mapping index texture, having texel index values, and using physical material properties, comprising the steps of:
    (a) storing a look-up table, having table entries defining material types, wherein each table entry has an index, and at least two material property type values;
    (b) selecting at least two texels from the index texture, each texel having index values and corresponding table entries;
    (c) averaging the material property type values for each separate material property type from the table entries for each selected texel, to produce an average material property value for each material property type; and
    (d) selecting a new material index based on the material which most closely matches the average material property values.

2. The method as in claim 1 further comprising the step of generating the next lowest MIP level by using the new material indexes created in step (d) to form a new index texture with fewer texels.

3. The method as in claim 1 wherein step (a) further comprises the step of storing color values which simulate infrared viewing.

4. The method as in claim 1 wherein step (a) further comprises the step of storing gray scale values which simulate infrared viewing.

5. The method as in claim 1 wherein the step of storing an indexed table further comprises the step of storing an indexed table, having table entries defining material types, wherein the material types are selected from the group consisting of emissivity, absorption, conductivity, diurnal depth, specific heat and density.

6. The method as in claim 1 further comprising the step of storing modulation bits with the index of the look up table.

7. The method as in claim 1 further comprising the step of storing modulation bits with the look up table index, and using the modulation bits to store boundary temperatures.

8. The method as in claim 7 further comprising the steps of dividing a value stored in the modulation bits by four to produce a result and multiplying the result with a color stored in the table entry.

9. A method for MIP mapping index texture having index values which refer to physical material proper ties, comprising the steps of:
(a) storing a look up table having table entries defining material types, wherein each table entry has at least two material property types which are used to generate material colors;
(b) storing at least two material property types as a function which substantially models a coefficient of conductivity;
(c) selecting at least two texels from the index texture, each texel having index values corresponding to table entries;
(d) averaging material property type values for each separate property type from the table entries for each selected texel, to produce an average material property value for each material property type; and
(e) selecting a new material index based on the material which most closely matches the average material property values.

10. The method of claim 9 wherein step (b) further comprises the step of storing the coefficient of conductivity as a function of the conductivity (K), the specific heat (c), and the density ($\rho$).

11. The method of claim 9 wherein step (b) further comprises the step of storing the coefficient of conductivity as the following function:

$$\kappa = K/c\rho$$

where is the conductivity, c is the specific heat, and $\rho$ is the density.

12. The method as in claim 9 wherein step (b) further comprises the step of storing the coefficient of conductivity as a linear function.

13. An index texture having texel index values and MIP maps based on physical material properties, comprising:
(a) an index texture map which contains texel index values;
(b) a common material table to which the texel index values refer, the common material table having at least two material property types for each material;
(c) selecting means for selecting at least two texels from the index texture, each texel having index values and corresponding table entries;
(d) averaging means for averaging material property type values for each property type from the at least two texels, to produce an average material property value for each material property type; and
(e) search means for finding a new material index based on a material which most closely matches each average material property value for each material property type.

14. The index texture as in claim 13 further comprising a lower level MIP map including a plurality of new material indexes generated by the search means.

15. The index texture as in claim 13 further comprising a display means for displaying color values for the index texture based on the properties in the common material table.

16. The index texture as in claim 13 further comprising a display means for displaying monochrome values for the index texture based on the properties in the common material table.

17. The index texture as in claim 13 wherein the index texture map contains at least 224 entries.

18. The index texture of claim 13 wherein the common material table contains material property values selected from the group consisting of emissivity, absorption, conductivity, diurnal depth, specific heat and density.

19. The index texture as in claim 18 wherein the emissivity further comprises using the values between approximately 0.5 to 0.9.

20. The index texture as in claim 18 wherein the absorption further comprises using the values between approximately 0.4 and 0.8.

21. The index texture as in claim 18 wherein the absorption further comprises using the values between approximately 0.4 and 0.1.

22. The index texture as in claim 18 wherein the conductivity further comprises using the values of 0.5, and 2.

23. The index texture as in claim 18 wherein the diurnal depth further comprises using the values between 0.01 and 0.20.

* * * * *